US008078233B1

(12) United States Patent
Sennett et al.

(10) Patent No.: US 8,078,233 B1
(45) Date of Patent: Dec. 13, 2011

(54) WEIGHT BASED DETERMINATION AND SEQUENCING OF EMERGENCY ALERT SYSTEM MESSAGES FOR DELIVERY

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 905 days.

(21) Appl. No.: 11/924,235

(22) Filed: Oct. 25, 2007

Related U.S. Application Data

(60) Provisional application No. 60/911,148, filed on Apr. 11, 2007, provisional application No. 60/911,127, filed on Apr. 11, 2007, provisional application No. 60/911,137, filed on Apr. 11, 2007.

(51) Int. Cl.
*H04H 20/71* (2008.01)
*H04H 40/00* (2008.01)
*H04B 1/38* (2006.01)

(52) U.S. Cl. ....... 455/567; 455/3.01; 455/3.06; 455/344

(58) Field of Classification Search ................. 455/3.01, 455/3.06, 344, 66.1, 404.1, 404.2, 567; 379/37–51
See application file for complete search history.

(56) References Cited

U.S. PATENT DOCUMENTS

| | | | | |
|---|---|---|---|---|
| 5,121,430 | A * | 6/1992 | Ganzer et al. | 380/258 |
| 6,112,075 | A | 8/2000 | Weiser | |
| 6,204,761 | B1 * | 3/2001 | Vanderable | 340/539.28 |
| 6,222,074 | B1 * | 4/2001 | Tokunaga et al. | 564/415 |
| 6,329,904 | B1 * | 12/2001 | Lamb | 340/286.02 |
| 6,617,964 | B1 * | 9/2003 | Lamb | 340/286.02 |
| 6,670,908 | B2 * | 12/2003 | Wilson et al. | 342/26 R |
| 6,867,688 | B2 * | 3/2005 | Lamb | 340/286.02 |
| 7,339,467 | B2 * | 3/2008 | Lamb | 340/539.1 |
| 7,599,685 | B2 * | 10/2009 | Goldberg et al. | 455/421 |
| 7,657,224 | B2 * | 2/2010 | Goldberg et al. | 455/3.06 |
| 7,742,740 | B2 * | 6/2010 | Goldberg et al. | 455/11.1 |
| 7,835,689 | B2 * | 11/2010 | Goldberg et al. | 455/3.06 |
| 7,865,137 | B2 * | 1/2011 | Goldberg et al. | 455/11.1 |
| 2006/0040639 | A1 * | 2/2006 | Karl et al. | 455/404.1 |

* cited by examiner

*Primary Examiner* — Tilahun B Gesesse
(74) *Attorney, Agent, or Firm* — Woodcock Washburn LLP

(57) ABSTRACT

An Emergency Alert System (EAS) alert message can be provided based on one or more weights that can correspond to a message type, one or more attributes, and/or one or more classifications of the alert message. For example, alert messages having one or more weights above a particular a threshold weight can be broadcasted to a mobile device. Additionally, the weights can be used to determine the sequence, priority, and/or order in which the alert message can be broadcast to the mobile device.

22 Claims, 5 Drawing Sheets

WEIGHT BASED DETERMINATION AND SEQUENCING OF EMERGENCY ALERT SYSTEM MESSAGES FOR DELIVERY

CROSS-REFERENCE TO RELATED APPLICATIONS

This application claims benefit under 35 U.S.C. §119(e) of provisional U.S. patent applications 60/911,148, 60/911,127, and 60/911,137 the disclosures of which are incorporated herein by reference.

TECHNICAL FIELD

The technical field generally relates to communications systems and more specifically relates to the broadcast of Emergency Alert System (EAS) messages. Even more specifically, the technical field relates to determining and sequencing which EAS messages are received by mobile devices.

BACKGROUND

Wireless device subscribers may receive multiple Emergency Alert System (EAS) alert messages concurrently from multiple origination points (e.g., local, county, state, federal). This may be especially so under disaster conditions or widespread emergencies. Typically, such alerts tend to be provided in the order they are received. Unfortunately, the delivery of more urgent alerts may be delayed by less urgent alerts. For example, a life threatening alert such as a tornado warning, a hurricane warning, or the like can be delayed by a less severe alert such as a thunderstorm watch, or the like when the less sever alert is received by the system before the life threatening alert.

Additionally, there are approximately 30 different types of emergency alert messages, each having various attributes including, but not limited to, urgency, severity, and certainty. A wireless operator or network provider may waste network resources on and/or flood a subscriber's wireless device with "meaningless" alert messages that tend to be irrelevant to the network provider and/or subscribers.

SUMMARY

Wireless Emergency Alert System (EAS) alert messages are provided to a mobile device based on whether the alert messages meet one or more criteria defined by the network provider and/or subscriber. For example, alert messages can be assigned weights by the network provider such that the network provider broadcasts alert messages above a particular a threshold weight. Additionally, the weights can be used to determine the sequence, priority, and/or order in which the alert message gets broadcast by the network provider. The subscriber can also establish a subscriber threshold weight that can be used to determine whether to broadcast alert messages to the subscriber's mobile device.

BRIEF DESCRIPTION OF THE DRAWINGS

The foregoing and other objects, aspects and advantages of configuring EAS alert messages will be better understood from the following detailed description with reference to the drawings.

DETAILED DESCRIPTION OF ILLUSTRATIVE EMBODIMENTS

Figure 1:
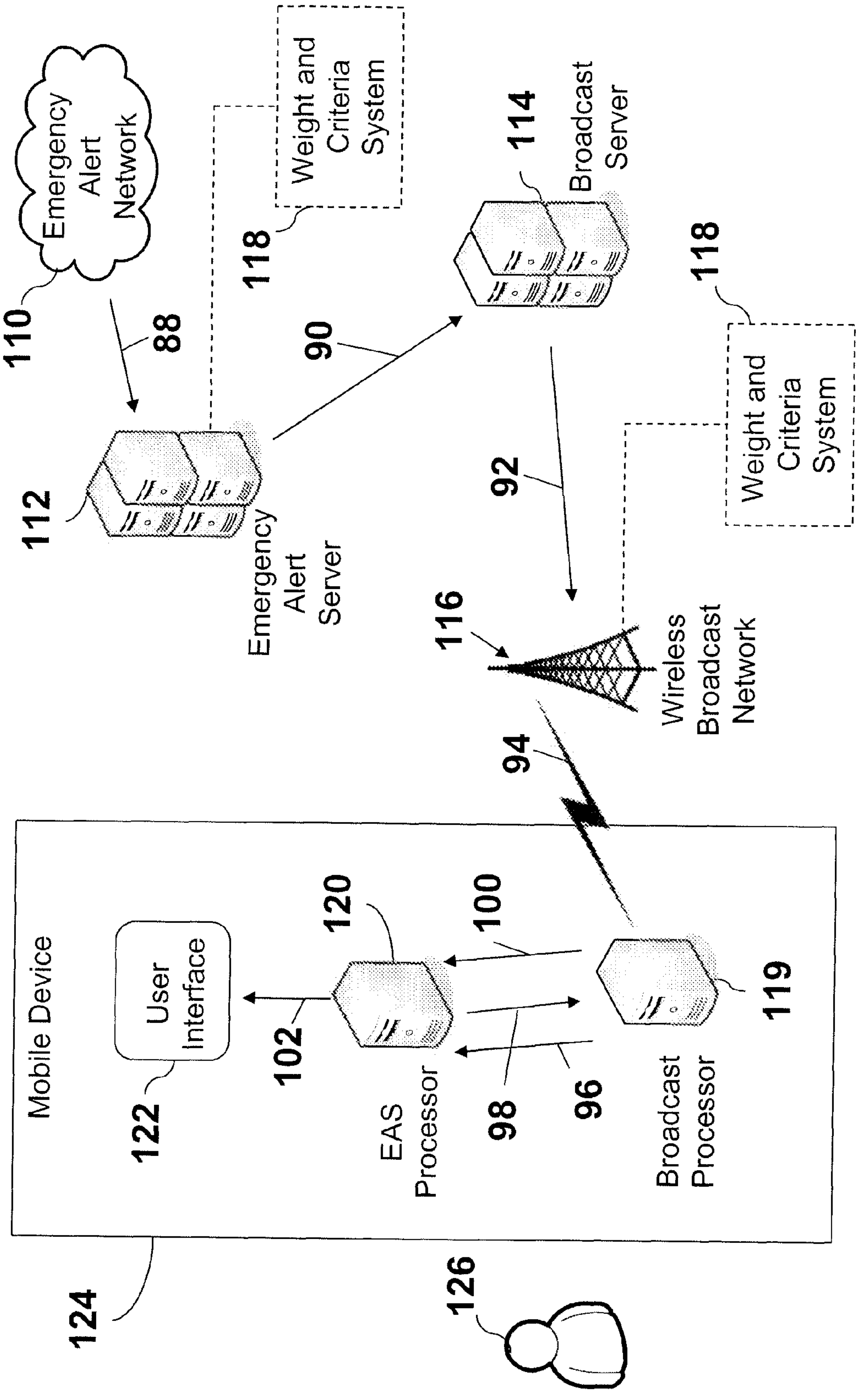
FIG. 1 is a flow diagram of an example system and process for providing alert messages to a mobile device.

As will be described herein, Emergency Alert System (EAS) alert messages can be broadcast based on one or more weights, a network threshold, and/or a subscriber threshold. For example, each alert message can include a message type, one or more attributes, and/or one or more classifications and/or classifications embodied as a vector, metadata, a header, embedded data, or the like packaged therewith.

In an example embodiment, a network operator (e.g., at the EAS server, the broadcast server, and/or the wireless broadcast network), or the like can implement a network threshold on the Emergency Alert System (EAS) alert messages that are delivered to a mobile device. For example, weights can be assigned to message type such as tornado warning, hurricane warning, tenor alert level, presidential messages, volcano warning, hurricane warning, or the like of each of the broadcasted alert messages. The network provider can select the message type it wishes to broadcast based on the value of the assigned weights. Additionally, weights can be assigned to attributes such as urgency, severity, and certainty. The network provider can select the lowest attribute of emergency alerts (e.g. threshold) of emergency alerts that it is willing to transmit, or that the network can handle at a time. Additionally, the distributions of all sums for all weights for all attribute values can also classified into classes such as, for example, "Critical Life Threatening," "Imminent Danger," "Probable Danger," and "Possible Threat." The network operator can also select the lowest class (e.g., threshold) of emergency alerts that it is willing to transmit, or that the network can handle at the time. For example, if the network operator selects "Probable Danger," then any emergency alert classified as "Critical Life Threatening," "Imminent Danger," or "Probable Danger" would be delivered. However, any emergency alert classified as "Possible Threat" would be ignored. In another example, embodiment the weights assigned to the message type, attributes, and/or classifications can also be combined such that the network provider can select a lowest combined weight that it is willing to transmit, or that the network can handle at a time.

A subscriber, via the Internet or the like, can selectively receive Emergency Alert System (EAS) alert messages in accordance with weighted attribute values according to one embodiment. As described above, weights can be assigned to alert types and/or attributes. The distribution of all sums for all weights for all attribute values can be categorized and associated with higher level tags such as "Critical Life Threatening," "Imminent Danger," "Probable Danger," and "Possible Threat". Each of these tags can be assigned a numerical value. The subscriber can select the level of emergency alerts that she wishes to receive (e.g., Critical or Imminent only). In one example, if the calculated sum of the weights is greater than the weight associated with the subscriber's selection level of alerts, the EAS alert message can be broadcast to the subscriber's mobile device. If the calculated sum of the weights is less than the weight associated with the subscriber's selection level of alerts, the wireless network provider may not broadcast the EAS alert message.

Additionally, each EAS alert message received by the network provider can be broadcast to the subscriber's mobile device. The subscriber's mobile device can be programmed to render the EAS alert messages having a calculated sum of the weights greater than the weight associated with the subscriber's selection level of alerts. If the calculated sum of the weights is less than the weight associated with the subscriber's selection level of alerts, the subscriber's mobile device may not render the EAS alert message. For example, if the subscriber selects "Probable Danger," then any emergency alert classified as "Critical Life Threatening," "Imminent Danger," or "Probable Danger" would be rendered on her mobile device. However, any emergency alert classified as "Possible Threat" would not be rendered.

In one embodiment, the weights assigned to the alert type, attributes, and/or classifications can be used to prioritize and/or sequence Emergency Alert System (EAS) alert messages delivered to subscribers. For example, as described above, attributes of an EAS alert message can be assigned numeric values (weights) indicative of one or more attributes associated with the alert messages. The attributes can include numerical values associated with urgency, severity, and certainty. For example, the attributes can include numerical values associated with Unknown, Immediate, Extreme, Observed, and Presidential, wherein Unknown has the lowest value and Presidential has the highest value according to one embodiment. When each EAS alert message is received, the numerical weights associated with the alert types, attributes, and/or classifications can be combined (e.g., summed). The EAS alert messages with the highest scores can then be placed at the top of the queue and the EAS alert messages with lowest scores at the bottom. Thus, the position of an EAS alert message in the queue can be indicative of the broadcast order or sequence of the EAS alert messages.

FIG. 1 depicts a flow diagram of an example system and process for providing alert messages to a mobile device. EAS alert messages are provided, at step 88, via the emergency alert network 110, to the emergency alert server 112. In an example embodiment, the emergency alert server 112 can analyze the broadcasted EAS alert messages to determine which alert types, attributes, and/or classifications are associated with each EAS alert message. For example, the emergency alert server can include a weight and criteria system 118. The weight and criteria system 118 can determine an alert message type, attributes, and/or classifications associated with each alert messages from the information in, for example, a vector, header, metadata, embedded data, or the like that can be packaged with the alert message. Based on the determination, the weight and criteria system 118 can assign one or more weights to each message. For example, in one embodiment, the weight and criteria system can store a particular weight that can include a numerical representation of the alert type, attributes, and/or classifications associated therewith, which will be described in more detail below.

In one embodiment, the weight and criteria system can assign an individual weight to the message type, each of the attributes, and/or each of the classifications. The weight and criteria system can use each of the individual weights to determine whether to broadcast an alert message and in what order the alert message should be broadcast. Alternatively, the weight and criteria system can combine each of the weights assigned to the message type, attributes, and/or classifications associated with each of the broadcasted message to establish a message weight. The message weight can then be used by the weight and criteria system to determine whether to broadcast the alert message and in what order the alert message should be broadcast relative to other received alert messages. For example, the weight and criteria system can determine whether the individual weights and/or the message weight match one or more criteria that may be established by a subscriber 126 and/or the operator of a wireless broadcast network 116. At step 90, alert messages that match one or more criteria can be provided by the emergency alert server 112 to the broadcast server 114. Additionally, at step 90, an indication of the alert message's position or order in a queue of alert messages can be provided to the broadcast server 114.

Alternatively, in another example embodiment, all broadcasted alert messages can be provided by the emergency alert server 112 to the broadcast server 114, at step 90. The broadcast server 114 can then provide the all of the alert messages to the wireless broadcast network 116 at step 92. The wireless broadcast network 116 can include the weight and criteria system 118 that can be used to determine whether to broadcast alert messages to the mobile device 124, which will be described in more detail below.

At step 92, the broadcast server 114 can provide the alert messages to the wireless broadcast network 116. The wireless broadcast network 116 can be any type of communication network including the example networks described below in FIGS. 3-5, for example. Additionally, the wireless broadcast network 116 can be operated by a network provider. The network provider can offer bandwidth and/or network access to its subscribers to enable communication between subscribers and other users of electronic devices and/or mobile devices such as cellular phones, PDAs, PCs, Voice over Internet Protocol devices, analog telephone devices, or the like.

As described above, if the weight and criteria system 118 is implemented within the emergency alert server 112, the wireless broadcast network 116 can broadcast each of the alert messages received from the broadcast server 114, at step 92, to the mobile device 124 at step 94.

Alternatively, if the weight and criteria system 118 is implemented within the wireless broadcast network 116, the wireless broadcast network 116 can analyze the broadcasted EAS alert messages to determine which alert types, attributes, and/or classifications are associated with each EAS alert message using the weight and criteria system 118. Based on the determination, the weight and criteria system 118 can assign individual weights corresponding to the message type, attributes, and/or classifications for each alert message. The individual weights corresponding to the message type, attributes, and/or classifications and/or a message weight that combines each of the weights associated with the message type, attributes, and/or classifications can be used by the weight and criteria system to determine whether to broadcast the alert message and in what order the alert message should be broadcast relative to other received alert messages. For example, the weight and criteria system can determine whether the individual weights and/or the message weight match one or more criteria that may be established by a subscriber 126 and/or the operator of a wireless broadcast network 116. At step 94, alert messages that match one or more criteria can be provided by the wireless broadcast network 116 to the mobile device 124. Additionally, at step 94, the alert messages can be provided by the wireless broadcast network 116 in a particular order as determined by the weight and criteria system.

That is, at step 94, the wireless broadcast network 116 can broadcast the alert messages to the mobile device 124 based on the determination by the weight and configuration system 118 implemented in either the emergency alert server 112 and/or the wireless broadcast network 116. The broadcast processor 119 of the mobile device 124 can receive the multiple alert messages (provided at step 94). In an example embodiment, the broadcast processor 119 can extract the individual weights and/or the message weight from the received alert message and provide, at step 100, the message type to the EAS processor 120 on the mobile device 124. As described above, the alert message received by the broadcast processor 119 can include each of the assigned weights corresponding to the message type, attributes, and/or classifications determined by the weight and criteria system. The broadcast processor 119 can extract the individual weights and/or the message weight that combines each of the individual weights and provide such weights to the EAS processor, at step 96.

Using pre-provisioned subscriber preferences such as an individual threshold weight for each message type, attributes, and/or classifications and/or a message threshold weight for the cumulative individual weights for each message that can be stored in the mobile device 124, the EAS processor 120 can determine if the emergency alert has a weight greater than the individual threshold weight and/or the message threshold weight that the subscriber wishes to receive. If the subscriber wishes to receive the broadcasted alert message based on the individual weights assigned to the message type, attributes, and/or classifications and/or the message weight combining the weights assigned to the message type, attributes and/or classifications, the EAS processor 120 provides, at step 98, to the broadcast processor 119 an indication that the broadcasted message should be received. For example, if the subscriber's message threshold weight indicates that the subscriber wishes to receive alert messages greater than or equal to five, the EAS processor 120 will instruct, at step 98, the broadcast processor 119 to receive the alert message if the message has a message weight of five or greater, for example. Additionally, if the subscriber's individual threshold weight for the message type indicates that the subscriber wishes to receive alert messages having a message type assigned an individual weight greater than or equal to five, the EAS processor 120 will instruct, at step 98, the broadcast processor 119 to receive the alert message if the message type is assigned an individual weight of five or greater, for example. The EAS processor 120 can also instruct the broadcast processor 119 to block alert messages that are below the individual threshold weights and/or the message threshold weight.

Upon receipt of the indication to receive the alert messages from the EAS processor 120, the broadcast processor 119 obtains the alert message and provides, at step 100, the EAS alert message to the EAS processor 120. At step 102, the EAS processor 120 provides the received alert message, to the user interface 122. The user interface 122 can render the alert message and output the alert message in, for example, an audio format, a visual format, and/or any other suitable format to the subscriber.

The mobile device 124 is representative of any appropriate type of device that can be utilized to receive an alert message, store one or more threshold weights based on the message type, attributes, and/or classifications the subscriber wishes to receive on mobile device 124, and render and output the alert message in a suitable format to the subscriber. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television).

Each of the emergency alert server 112, the broadcast server 114, the mobile device 124, the broadcast processor 119, and the EAS processor 120 can comprise any appropriate type of processor. Example processors can be implemented in a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof. The EAS processor 120 and the broadcast processor 119 can be implemented as a single processor, separate processors, distributed processors, or a combination thereof. The emergency alert server 112 and the broadcast server 114 can be implemented as a single processor, separate processors, distributed processors, or a combination thereof.

Figure 2:
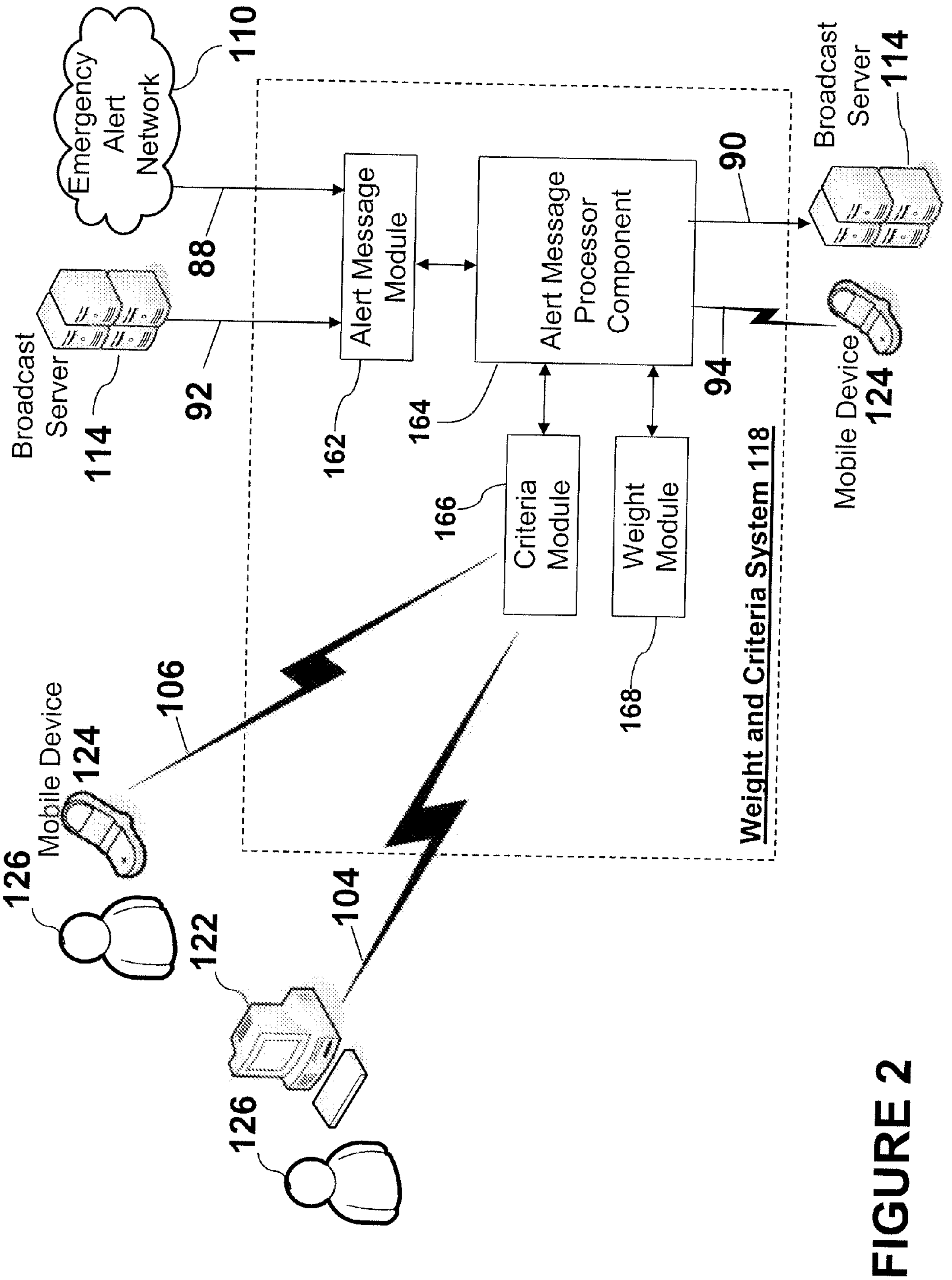
FIG. 2 depicts an example embodiment of a weight and criteria system for providing messages based on one or more weights associated with an alert message.

FIG. 2 depicts an example embodiment of a weight and criteria system 118 for providing messages based on one or more weights assigned to each of the alert messages. As described above, the weight and criteria system 118 can be implemented as a component in the emergency alert server 112.

Alternatively, the weight and criteria system 118 can be implemented as an independent component in the wireless broadcast network 116 that can be in operative communication with other components of the wireless broadcast network such as the MSC, the HLR, or the like described below in FIGS. 3-5. The alert and configuration system 118 can also be implemented as a component within the MSC, the HLR, or the like of the wireless broadcast network 116, as described below in FIGS. 3-5. For example, the weight and criteria system can be a feature added to HLR 774 depicted in FIG. 4. Thus, HLR 774 can assign weights to broadcasted alert messages based on the message type, attributes, and/or classifications, can determine whether to broadcast the alert messages based on weights, and can determine the order in which to broadcast the alert messages. Additionally, the functionality of the weight and criteria system implemented in the wireless broadcast network can be performed by any suitable hardware and/or software or any combination thereof within HLR 774, for example.

Thus, according to example embodiments, the weight and criteria system 118 can be implemented using a variety of techniques and hardware components including, but not limited to, servers, databases, microchips, storage devices, processors, or programmed modules. Furthermore, as described above, the weight and criteria system 118 can be implemented in the emergency alert server 112, as an independent component of the wireless broadcast network 116, as a separate component within existing components in the wireless broadcast network 116, and/or using existing components within the wireless broadcast network 116.

Figure 3:
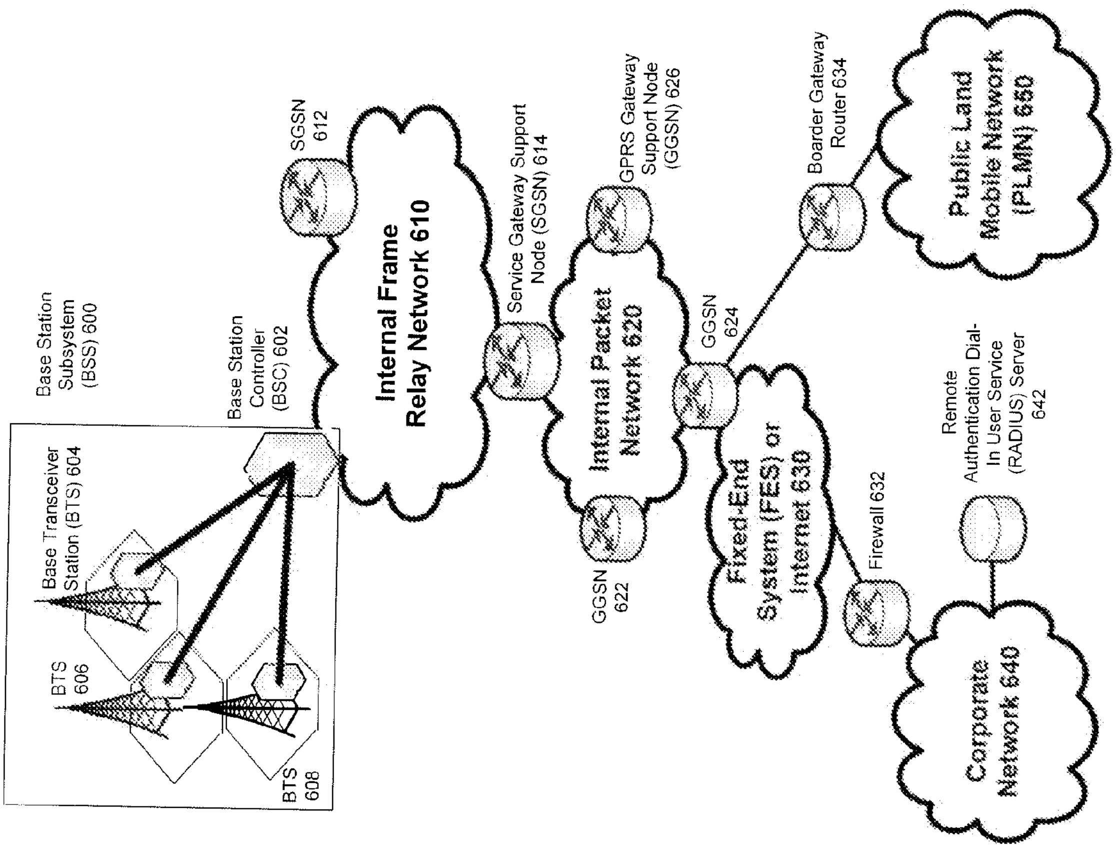
FIG. 3 depicts an overall block diagram of an exemplary packet-based mobile cellular network environment, such as a GPRS network, in which the system for providing alert messages based on a characteristic and/or configuration can be practiced.

As shown in FIG. 3, the weight and criteria system 118 can include an alert message module 162. The alert message module 162 can store messages received from the emergency alert network. For example, the alert message module 162 can store the alert message provided to the emergency alert server 112, at step 88, from the emergency alert network 110. Additionally, according to an example embodiment, the alert message module 162 can store the alert message provided to the wireless broadcast network 116, at step 92, from broadcast server 114. The alert message module can include, for example, RAM memory chips, registers, hard drives, or any suitable hardware designed to store data. Thus, alert message module 162 can be in communication with the emergency alert network 110 and/or the broadcast server 114 such that the alert message module 162 can receive and store alert messages including the message type, attributes, and/or classifications packaged therewith type of each message provided by emergency alert network 110, at step 88, and/or the broadcast server 114, at step 92, as described above. The alert message module 162 can also store weights corresponding to the message type, attributes, and/or classifications as assigned by an alert message processor component 164, which will be described in more detail below.

The weight and criteria system 118 can include a criteria module 166. According to one embodiment, criteria module 166 can be configured to store one or more criteria for determining whether to broadcast the alert messages and/or in what order to broadcast the alert messages to the mobile device 124. For example, weight module 168 can include a database, RAM memory chips, registers, hard drives, or any suitable hardware designed to store data. The criteria module 166 can store one or more criteria such as one or more thresholds, rules, or the like that can be used to determine whether to broadcast an alert message stored in the alert message module 162 and/or in what order to broadcast the alert messages stored in the alert message module 162. The thresholds, rules, or the like can be established by the network provider of the wireless broadcast network 116. Thus, according to one embodiment, criteria module 166 can also be in operative communication with the HLR, the MSC, or any other components of the wireless broadcast network, as described below in FIGS. 3-5 such that the criteria module 166 can be updated by the network provider with additional threshold, rules, or the like that can be used to determine whether to provide one or more alert messages to the mobile device and/or in what order to provide the alert messages to the mobile.

Additionally, as shown, the subscriber 126 can establish thresholds, rules, or the like indicative of whether the subscriber wishes to receive alert messages having certain weights assigned thereto. The subscriber 126 can generate thresholds, rulers, or the like using an electronic device 122 such as a computer, PDA, or the like and/or the mobile device 124. At step 104 and/or step 106, such thresholds, rules, or the like can be provided to and received by the criteria module 166. For example, a display such as a web page can be provided to the user via the wireless broadcast network, an internet connection, or the like. The subscriber 126 can input one or more thresholds, for example, in the display that indicate the weights that need to be associated with a broadcasted alert message the subscriber wishes to receive. According to one embodiment, the thresholds, rulers, or the like can be synchronized to and stored in the mobile device, as described above. The alert message module 162 can store the customized thresholds, rulers, or the like for each subscriber based on, for example, the subscriber's mobile device number and/or any other suitable identifier of the subscriber. Characteristic module 166 can receive and store one or more characteristics provided by the mobile device 124 at step 100, for example.

The weight and criteria system 118 can further include a weight module 168. According to one embodiment, weight module 168 can be configured to store one or more weights corresponding to message types, attributes, and/or classifications corresponding to the broadcasted alert messages. For example, weight module 168 can include a database, RAM memory chips, registers, hard drives, or any suitable hardware designed to store data. The weight module 168 can store one or more weights that can include numerical values associated with particular message types such as tornado warnings, terror alert levels, volcano warnings, or the like of the alert messages, particular attributes such as, for example, urgency, severity, and/or certainty that can be associated with the alert messages, and/or particular classifications such as, for example, "Critical Life Threatening," "Imminent Danger," "Probable Danger," and "Possible Threat" that can be associated with the alert messages.

The weight and criteria system 118 can also include an alert message processor component 164. The alert message processor component 164 can be in operative communication with alert message module 162, criteria module 166, and weight module 168. The alert message processor component 164 can include, for example, a standard processor, a specialized processor, or the like. The alert message processor component 164 can engage in an alert message analysis to determine the message type, attributes, and/or classifications associated with each broadcasted alert message. The alert message processor component 164 can also provide such information to the weight module to determine the appropriate weights to assign to message type, attributes, and/or classifications. That is, according to one embodiment, the alert message processor component 164 can compare the message type, attributes, and/or classifications with the message types, attributes, and/or classifications stored in the weight module 168 to assign weight values corresponding thereto. The alert message processor component 164 can then provide the weight values to the alert message module 162 for each of the broadcasted alert messages received, at step 88 and/or step 92, for example. The alert message processor component 164 can also combine the weights of the message type, attributes, and/or classifications for each of the alert messages to establish a message weight.

For example, according to one embodiment, a tornado warning can be assigned a value of 25 whereas a tornado watch can be assigned a value of 20. Furthermore, the urgency attribute can be assigned a value of 15. The urgency attribute can further be classified as immediate, expected, future, past, and unknown. In an example embodiment, the immediate classification can be assigned the value 5, the expected classification can be assigned the value 4, the future classification can assigned the value 3, the past classification can be assigned the value 2, and the unknown classification is assigned the value 1. The severity attribute can be assigned a value of 10, for example. The severity attribute can further be classified as extreme, severe, major, minor, and unknown. In an example about the extreme classification can be assigned a value 5, the severe classification can be assigned a value 4, the major classification can be assigned the value 3, the modern classification can be assigned a value 2, and the unknown classification can be assigned a value 1. The certainty attribute can be assigned a value of 12, for example. The certainty attribute can further be classified as observed, likely, possible, and unlikely. In an example embodiment the observed classification can be assigned the value 4, the likely category can be assigned the value 3, the possible classification can be assigned the value 2, and the unlikely classification can be assigned the value 1.

The message processor component 164 can compare the individual weights assigned to the message type, attributes, and/or classifications and/or the message weights to the thresholds, rules, or the like stored in the criteria module 166. If the individual weights and/or the message weight exceeds, for example, one or more thresholds established by the network provider and/or the subscriber, the alert message processor component 164 can provide the broadcasted alert based on the determination to the mobile device at step 94. Alternatively, if the individual weights and/or the message weight exceeds, for example, one or more thresholds established by the network provider and/or the subscriber, the alert message processor component 164 can provide the broadcasted alert based on the determination to the broadcast server 114 at step 90.

Additionally, the message processor component 164 can determine an order in which to broadcast the messages based on the weights. For example, the message processor component 164 can broadcast the alert messages in the appropriate order to the wireless device 124, at step 104, or can provide an indication, at step 90, of the order of a particular alert message in a queue of alert messages received by the broadcast server 114. For example, if message 1, message 2, and message 3 are received, at step 88 and/or step 92, by the alert message module 162 and message 1 is assigned a message weight of five, message 2 is assigned a message weight of seven, and message 3 is assigned a message weight of one, the message processor component 164 can broadcast message 2 followed by message 1 followed by message 3 to the mobile device at step 94. Alternatively, the message processor component 164 can establish an indication that places message 2 in the front of the queue, message 1 in the middle of the queue, and message 3 at the end of the queue that can be provided to the broadcast server 114.

Thus, according to example embodiments, applies a threshold to the message type, attributes and/or classes of alert messages. Only those alert messages with a message type, attributes, and/or classes above the threshold can be provided to the mobile device 124.

The following description sets forth some exemplary telephony radio networks and non-limiting operating environments for broadcasting secure messages. The below-described operating environments should be considered non-exhaustive, however, and thus the below-described network architectures merely show how EAS alert messages may be incorporated into existing network structures and architectures. It can be appreciated, however, that EAS alert messages can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS alert messages can be applied independently of the method for data transport, and do not depend on any particular network architecture, or underlying protocols.

FIG. 3 depicts an overall block diagram of an exemplary packet-based mobile cellular network environment, such as a GPRS network, in which the system for implementing a configuration based EAS alert message can be practiced. In an example configuration, the emergency alert network 110 and/or the wireless broadcast network 116 are encompassed by the network environment depicted in FIG. 3. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., portable device 38) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 4:
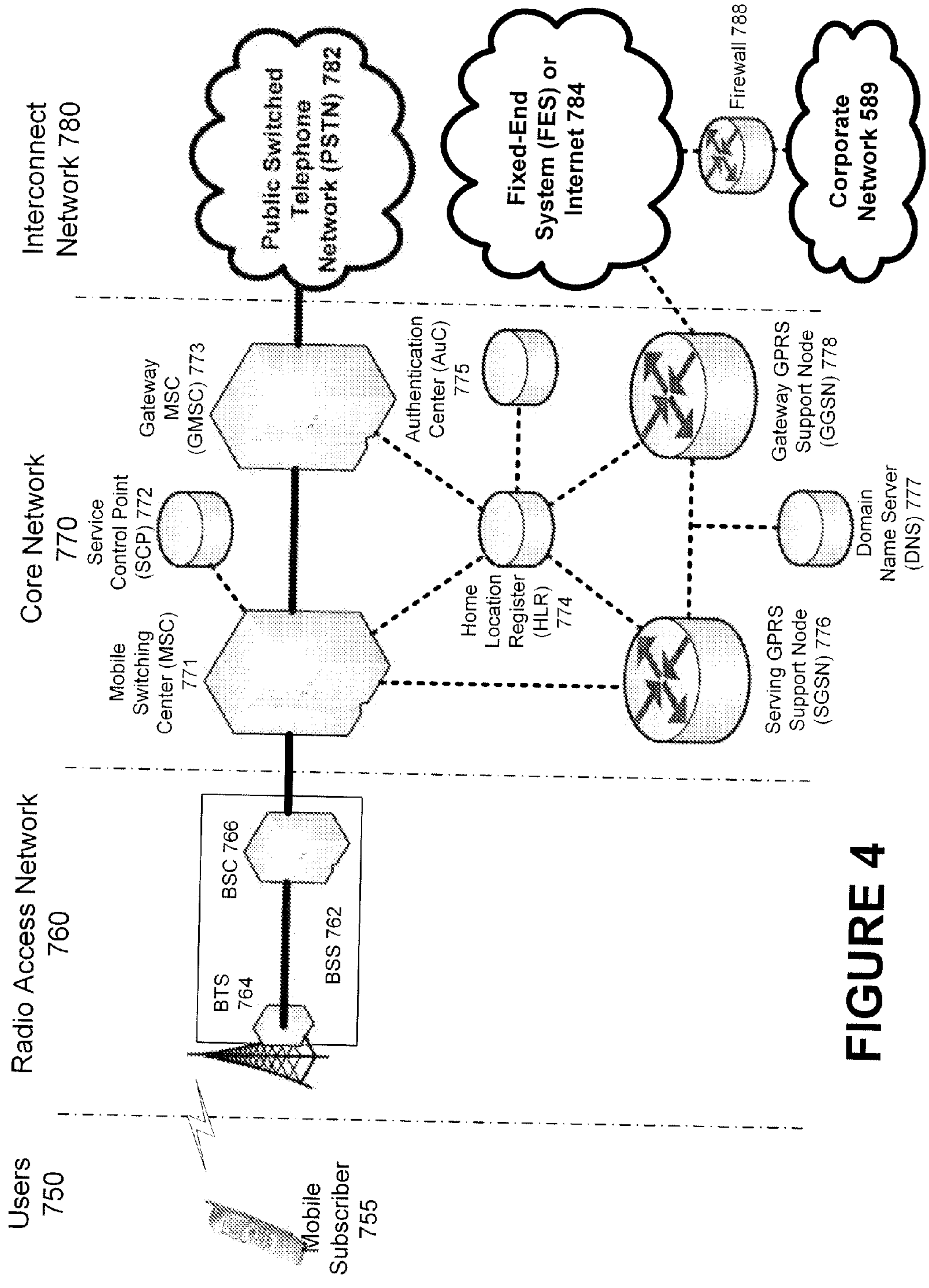
FIG. 4 illustrates an architecture of a typical GPRS network as segmented into four groups.

FIG. 4 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 4). In an example embodiment, the device depicted as mobile subscriber 755 comprises portable device 38. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 4, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 124, used by an end user of the mobile cellular service. When a mobile subscriber turns on his or her mobile device, the mobile device goes through an attach process by which the mobile device attaches to an SGSN of the GPRS network. In FIG. 4, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 4) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of a configuration based EAS alert message can include but are not limited to Gateway GPRS Support Node tables, Fixed End System router tables, firewall systems, VPN tunnels, and any number of other network elements as required by the particular digital network.

Figure 5:
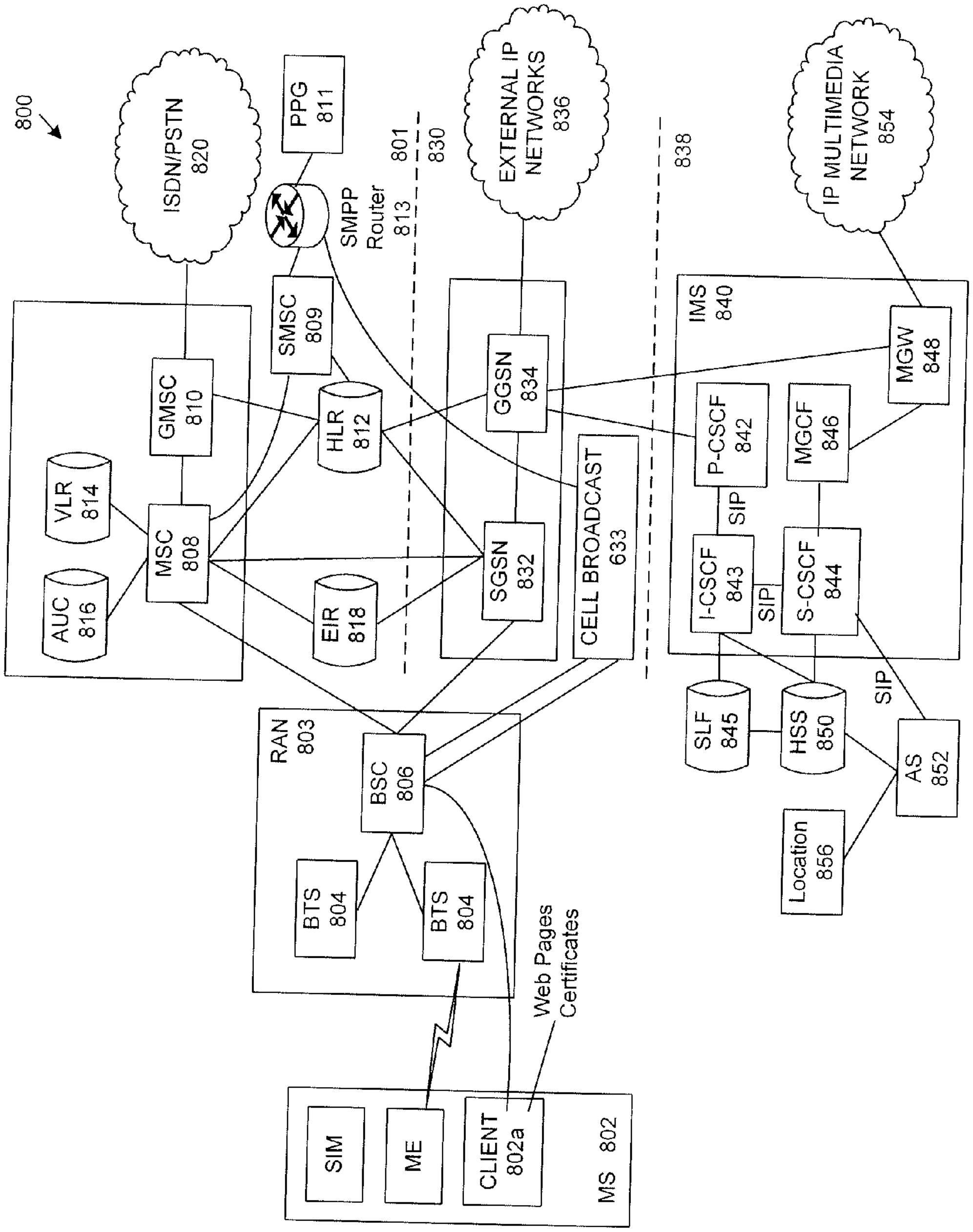
FIG. 5 illustrates an example alternate block diagram of an exemplary GSM/GPRS/IP multimedia network architecture in which alert messages based on a characteristic and/or configuration can be incorporated.

FIG. 5 illustrates another exemplary block diagram view of a GSM/GPRS/IP multimedia network architecture 800 in which a configuration based EAS alert message can be incorporated. As illustrated, architecture 800 of FIG. 5 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., portable device 38) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of assigning weights and establishing criteria such as thresholds, rules, or the like that can be used determine whether to broadcast EAS alert messages and in what order broadcast such messages based on the weights have been described in connection with various computing devices, the underlying concepts can be applied to any computing device or system capable of assigning weights and establishing criteria such as thresholds, rules, or the like that can be used determine whether to broadcast EAS alert messages and in what order broadcast such messages based on the weights. The various techniques described herein can be implemented in connection with hardware or software or, where appropriate, with a combination of both. Thus, the methods and apparatus of establishing configurations and/or characteristics that can be used determine whether to broadcast EAS alert messages, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing configurations and/or characteristics that can be used to filer EAS alert messages. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus of assigning weights and establishing criteria such as thresholds, rules, or the like that can be used determine whether to broadcast EAS alert messages and in what order broadcast such messages based on the weights also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for establishing configurations and/or characteristics that can be used determine whether to broadcast EAS alert messages. When implemented on a general-purpose processor, the program code combines with the processor to provide a unique apparatus that operates to invoke the functionality of configurations and/or characteristics that can be used determine whether to broadcast EAS alert messages. Additionally, any storage techniques used in connection with an EAS alert message can invariably be a combination of hardware and software.

While assigning weights and establishing criteria such as thresholds, rules, or the like that can be used determine whether to broadcast EAS alert messages and in what order broadcast such messages based on the weights has been described in connection with the various embodiments of the various figures, it is to be understood that other similar embodiments can be used or modifications and additions can be made to the described embodiment for performing the same functions described herein. For example, one skilled in the art will recognize that a system of assigning weights and establishing criteria such as thresholds, rules, or the like that can be used determine whether to broadcast EAS alert messages and in what order broadcast such messages based on the weights as described may apply to any environment, whether wired or wireless, and may be applied to any number of devices connected via a communications network and interacting across the network.

What is claimed is:

1. A method of providing alert messages, the method comprising:

receiving a broadcast alert message;

assigning a weight to the broadcast alert message, wherein the weight is indicative of a predetermined configuration;

determining if the assigned weight matches at least one predetermined criteria, and if the assigned weight is determined to match the at least one predetermined criteria, rebroadcasting the broadcast alert message.

2. A method in accordance with claim 1, wherein the broadcast alert message comprises at least one of: a broadcast message type, an attribute of the message, or a classification of the message.

3. A method in accordance with claim 2, wherein the weight is assigned to the broadcast alert message based on at least one of: the broadcasted message type, the attribute, or the classification.

4. A method in accordance with claim 1, wherein the broadcast alert message comprises an Emergency Alert System alert message.

5. A method in accordance with claim 1, wherein determining if the assigned weight matches at least one criteria comprises determining if the assigned weight exceeds a threshold weight.

6. A method in accordance with claim 5, wherein a subscriber of a network provider establishes the threshold weight.

7. A method in accordance with claim 5, wherein a network provider establishes the threshold weight.

8. A method in accordance with claim 1, wherein the at least one predefined criteria comprises a numerical representation associated with at least one of an alert type, a location of a recipient, or a predetermined preference configuration.

9. A system for determining alert messages to be received by a mobile device, the system comprising at least one processor configured to:

receive a first broadcasted alert message and a second broadcasted alert message, wherein the first broadcasted alert message comprises a first weight and the second broadcasted alert message comprises a second weight;

determine a sequence of the first broadcasted alert message and the second broadcasted alert message based on the respective first and second weights; and rebroadcast the first and second alert messages to the mobile device in the determined sequence.

10. The system in accordance with claim 9, wherein the at least one alert message comprises an Emergency Alert System alert message.

11. The system in accordance with claim 9, wherein the first weight comprises a first individual weight assigned to at least one of a message type, one or more attributes associated with the first broadcasted alert message, and one or more classifications associated with the first broadcasted alert message and the second weight comprises a second individual weight assigned to at least one of a message type, one or more attributes associated with the second broadcasted alert message, and one or more classifications associated with the second broadcasted alert message.

12. The system in accordance with claim 9, wherein the first weight comprises a first message weight that combines each of the weights assigned to at least one of a message type, one or more attributes associated with the first broadcasted alert message, and one or more classifications associated with the first broadcasted alert message and the second weight comprises a second message weight that combines each of the weights assigned to at least one of a message type, one or more attributes associated with the second broadcasted alert message, and one or more classifications associated with the second broadcasted alert message.

13. The system in accordance with claim 9, wherein the system comprises:

an alert messages module configured to store the first broadcasted alert message and first weight and the second broadcasted alert message the second weight;

a criteria module configured to store one or more criteria, wherein the criteria determine the sequence of the first broadcasted alert message and the second broadcasted alert message; and an alert message processor component in operative communication with the alert messages module and the criteria module, wherein the alert message processor component determines the sequence of the first broadcasted alert message and the second broadcasted alert message based on the respective first and second weights.

14. The system in accordance with claim 13, wherein the alert message processor component determines the sequence of the first broadcasted alert message and the second broadcasted alert message by comparing the first weight to the second weight.

15. The system in accordance with claim 14, wherein if the first weight is greater than the second weight the first broadcasted alert message is before the second broadcasted alert message in the sequence.

16. The system in accordance with claim 14, wherein if the first weight is greater than the second weight the first broadcasted alert message is before the second broadcasted alert message in the sequence.

17. A mobile device configured to:

receive a first broadcasted alert message and a second broadcasted alert message from a network provider of the mobile device, wherein the first broadcasted alert message and the second broadcasted alert message each comprise a respective weight;

determine whether to render the first broadcasted alert message and the second broadcasted alert message received from the network provider based on the respective weights;

determine a sequence of the first broadcasted alert message and the second broadcasted alert message based on the respective weights; and render the first broadcasted alert message and the second broadcasted alert message in the determined sequence if, based on the determination, the respective weights match one or more respective criteria.

18. The mobile device in accordance with claim 17, wherein the one or more criteria comprises a threshold weight.

19. The mobile device in accordance with claim 18, wherein the mobile device is configured to determine whether to render the broadcasted alert message based on the configuration and the characteristics by comparing the weight with the threshold weight, and wherein the broadcasted alert message is rendered if, based on the determination, the weight exceeds the threshold weight.

20. The mobile device in accordance with claim 17, the mobile device further configured to establish a communication session with a network provider of the mobile device.

21. The mobile device in accordance with claim 20, wherein the mobile device is configured to receive the threshold weight from the network provider during the communication session.

22. The mobile device of claim 17, wherein the mobile device comprises:

a processor configured to receive the weight and the broadcasted alert message; wherein the processor determines whether to render the broadcasted alert message received from the network based on the weight; and a user interface in operative communication with the processor, wherein the user interface renders the broadcasted alert message if, based on the determination, the weight matches the one or more criteria.

* * * * *